(12) United States Patent
Hagiwara et al.

(10) Patent No.: US 7,013,250 B2
(45) Date of Patent: Mar. 14, 2006

(54) SIMULATOR FOR AUTOMATIC VEHICLE TRANSMISSION CONTROLLERS

(75) Inventors: Kenji Hagiwara, Wako (JP); Shoichi Suzuki, Wako (JP); Yohei Takeda, Wako (JP); Ko Yoda, Wako (JP); Satoshi Terayama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 714 days.

(21) Appl. No.: 09/802,974

(22) Filed: Mar. 12, 2001

(65) Prior Publication Data

US 2001/0023393 A1 Sep. 20, 2001

(30) Foreign Application Priority Data

Mar. 14, 2000 (JP) .............................. 2000-070580

(51) Int. Cl.
*G06G 7/48* (2006.01)
*G06F 17/50* (2006.01)
(52) U.S. Cl. .................. 703/8; 703/2; 703/22; 701/55; 700/28; 477/110
(58) Field of Classification Search .................... 703/8, 703/2, 22; 701/51, 55; 700/28; 477/110, 477/152
See application file for complete search history.

(56) References Cited

U.S. PATENT DOCUMENTS 4,799,158 A * 1/1989 Patil ............................ 701/59

(Continued)

FOREIGN PATENT DOCUMENTS

JP 8-121583 5/1996

OTHER PUBLICATIONS

Scott A. Munns (Computer Simulation of Powertrain Components with Methodologies for Generalized System Modeling, Master of Science Thesis at University of Wisconsin-Madison 1996).*

(Continued)

*Primary Examiner*—Russell Frejd
(74) *Attorney, Agent, or Firm*—Westerman, Hattori, Daniels & Adrian, LLP

(57) ABSTRACT

A simulator having a computer-aided design (CAD) programs for verifying algorithms of a shift controller of an automatic transmission. The simulator includes a simulator main unit (a computer) which stores the programs and inputs the algorithm, and pseudo-signal generator which generates pseudo signals including operation signals for the hydraulic actuators. The programs includes first calculating means for calculating outputs of first to third models describing behavior of the engine, the transmission and the vehicle body at a first calculation cycle based on the algorithm and the pseudo signals. A second calculating means inputs the calculated outputs of the first and second models and calculates an output of a fourth model describing non-linear behavior in the second model at a second calculation cycle, shorter than the first calculation cycle, and verifies the algorithm based on the outputs of the first models. With this, it can simulate in real time the behaviors of the automatic vehicle transmission including the non-linear behavior of hydraulic actuators, thereby enabling verification or evaluation of the control algorithm in a real-world environment.

8 Claims, 15 Drawing Sheets

U.S. PATENT DOCUMENTS

| | | | |
|---|---|---|---|
| 4,942,787 A * | 7/1990 | Aoki et al. | 477/152 |
| 5,128,868 A * | 7/1992 | Imai et al. | 701/51 |
| 5,547,435 A * | 8/1996 | Grutter et al. | 477/110 |
| 6,275,760 B1 * | 8/2001 | Saito et al. | 701/55 |
| 2003/0018399 A1 * | 1/2003 | Havener et al. | 700/28 |

OTHER PUBLICATIONS

Diana Yanakiev et al (Engine and Transmission Modeling for Heavy-Duty Vehicles, May 1995)☐ ☐.*

Weeks et al ("Automotive Engine Modelling for Real-Time Control Using Matlab/Simuling", SAE paper no. 950417, Mar. 1995).*

Michelena et al ("Optimal Model-Based Decomposition of Powertrain System Design", ASME, Journal of Mechanical Design, Dec. 1995).* frederiksson et al ("Nonlinear Control apllied to Gearshifting in Automated Manual Transmissions" no date).*

Keum-Shik Hong et al ("Object-oriented modeling for gasoline engine and automatic transmission systems", Wiley Interscience, Computer Applications in Engineering Education, vol. 7, Issue 2, pp. 107-119, Jul. 27, 1999).*

* cited by examiner

FIG. 4

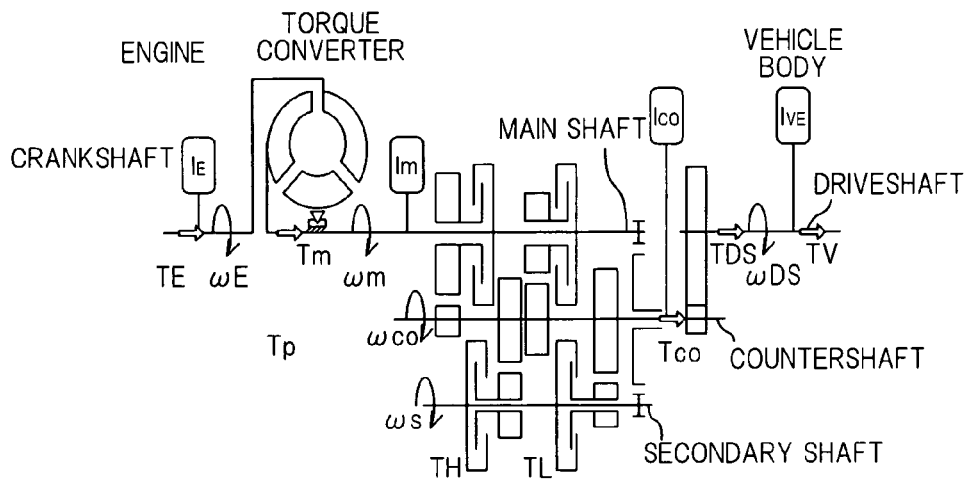

| | ENGINE | $T_E - T_p - I_E \cdot \dot{\omega}_E = 0$ | (1) |
|---|---|---|---|
| | TORQUE CONVERTER | $T_p = \tau(\dot{\omega}_E/1000)^2$ | (2) |
| | | $T_m = \kappa \cdot T_p$ | (3) |
| | MAIN SHAFT | $T_m - T_L - T_H - I_m \cdot \dot{\omega}_m = 0$ | (4) |
| | COUNTERSHAFT | $T_{co} - T_L \cdot i_L - T_H \cdot i_H + I_{co} \cdot \dot{\omega}_{co} = 0$ | (5) |
| | DRIVESHAFT | $T_{DS} = T_{co} \cdot i_F$ | (6) |
| | | $T_{DS} - T_V - I_{DS} \cdot \dot{\omega}_{DS} = 0$ | (7) |

TRANSITIONAL SHIFT PHASE

| PHASE | MAIN SHAFT | | COUNTER SHAFT | |
|---|---|---|---|---|
| LOW-GEAR DRIVE | $T_m = T_L$ | (8) | $T_{co} = T_m \cdot i_L$ | (9) |
| TORQUE PHASE | $T_m = T_H + T_L$ | (10) | $T_{co} = T_m \cdot i_L - T_H \cdot (i_L - i_H)$ | (11) |
| INERTIA PHASE | $T_m = T_H - I_m \cdot \dot{\omega}_m$ | (12) | $T_{co} = T_H \cdot i_H$ | (13) |
| HIGH-GEAR DRIVE | $T_m = T_H$ | (14) | $T_{co} = T_m \cdot i_H$ | (15) |

IN THE ABOVE,
TL: HIGH-GEAR CLUTCH TRANSMISSION TORQUE AND
TH: LOW-GEAR CLUTCH TRANSMISSION TORQUE

SIMULATOR FOR AUTOMATIC VEHICLE TRANSMISSION CONTROLLERS

BACKGROUND OF THE INVENTION

1. Field of the Invention

This invention relates to a simulator for automatic vehicle transmission controllers or control systems.

2. Description of the Related Art

The assignee proposes, in Japanese Laid-Open Patent Application Hei 8 (1996)-121583, a simulator having computer-aided design programs or packages for automatic transmission controllers or control systems which measures the running conditions of the vehicle at intervals, calculates verification indices relating to the shift shock based on the measured data, and sorts and outputs the calculation results by the manipulation of a device such as throttle opening and modes of shift, etc. Thus, the simulator permits simulation of the real-world controllers or control systems and aids automotive engineers in modifying the shift characteristics of the automatic transmission control.

A recent development among such a simulators is the development of one which can simulate the real-world transmission controllers or control systems in real time and aids the engineer in analyzing and verifying the control algorithm. However, even if the automatic transmission has accurately been modelled, since the model must include the non-linear behavior of hydraulic actuators (such as clutches) in the transmission, it is quite difficult to simulate the control in real time even when a high-performance computer is used. Here, the term "real time" is used to indicate simulation time with the property that a given period of actual time represents the same period of time in the system being modelled.

The non-linear behavior of the hydraulic actuator can be often described with the use of a λ-function and an integral factor in the simulation model. However, since this configuration usually requires computation at a relatively short cycle or intervals such as 1 µsec, the computation becomes highly frequent and hence, it will take much time to simulate the events even in a single shift.

BRIEF SUMMARY OF THE INVENTION

An object of this invention is therefore to overcome the aforesaid problems and to provide a simulator having computer-aided design programs or packages for automatic vehicle transmission controllers, which can simulate the behaviors of the automatic vehicle transmission including the non-linear behavior of hydraulic actuators in real time, thereby enabling designers to verify or evaluate control algorithms in a real-world environment.

In order to achieve the objects, there is provided a simulator having computer-aided design programs for verifying an algorithm of a shift controller of an automatic transmission mounted on a vehicle having a change-speed system and associated hydraulic actuators to transmit power generated by an internal combustion engine to drive wheels based on at least throttle opening and vehicle speed in accordance with the algorithm, comprising a computer which stores the computer-aided design programs in memory and connected to the shift controller for inputting the algorithm; pseudo signal generating means connected to the computer for generating pseudo signals indicative of at least the throttle opening, the vehicle speed and operation signals for the hydraulic actuators and for sending the pseudo signals to the computer; wherein the computer-aided design programs include: first calculating means for calculating outputs of a first model describing behavior of the engine, a second model describing behavior of the transmission and a third model describing behavior of a body of the vehicle at a first calculation cycle based on the algorithm and the pseudo signals; second calculating means for inputting at least the calculated outputs of the first model and the second model and for calculating an output of a fourth model describing non-linear behavior in the second model at a second calculation cycle which is shorter than the first calculation cycle; and algorithm verifying means for verifying the algorithm based on the outputs of the first model, the second model and the third model.

BRIEF DESCRIPTION OF THE DRAWINGS

This and other objects and advantages of the invention will be made more apparent with reference to the following description and drawings, in which:

FIG. 4 is an explanatory view showing equations of motion of the automatic transmission illustrated in FIG. 3;

DETAILED DESCRIPTION OF THE PREFERRED EMBODIMENT

An embodiment of the invention will now be explained with reference to the attached drawings.

Figure 1:
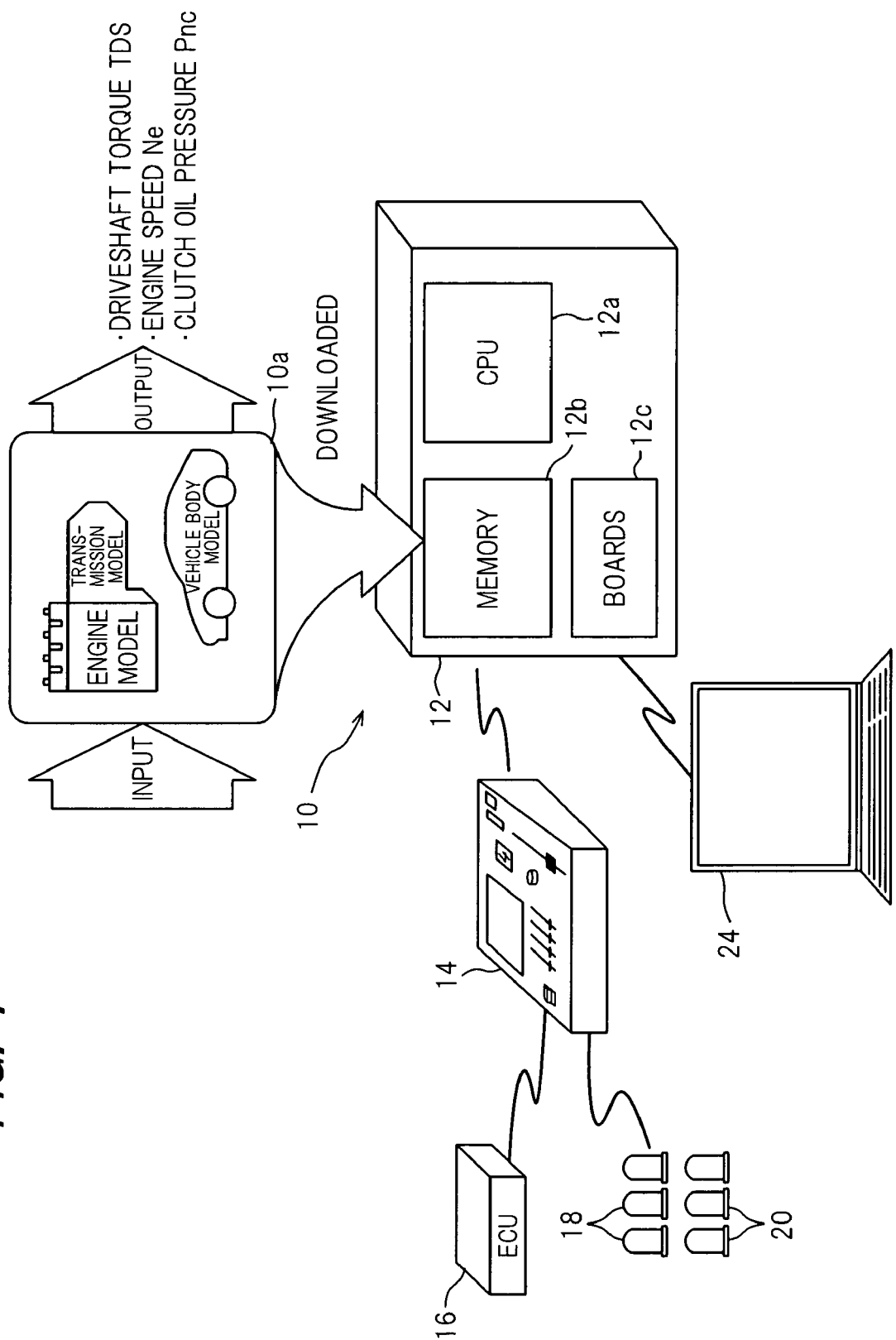
FIG. 1 is an overall schematic view of a simulator for automatic vehicle transmission controllers or control systems according to the embodiment of the invention.

FIG. 1 is an overall schematic view of a simulator for automatic vehicle transmission controllers or control systems according to the embodiment of the invention.

In the figure, reference numeral 10 indicates the simulator. The simulator 10 has computer-aided design (CAD) programs or package 10a (explained later) and a main unit 12 comprising a microcomputer (on which the programs are downloaded) having a CPU 12a, a memory 12b and a group of boards (generally indicated by 12c). The simulator main unit 12 is connected, through an input/output interface 14, with an electronic control unit (illustrated as "ECU" in the figure) 16 which corresponds to the controller or control system of an automatic transmission mounted on a vehicle.

The ECU 16 is an on-board microcomputer and employs stored functions and algorithms (processing programs) to control the gear (gear ratio) in accordance with shift scheduling based on at least the throttle opening θTH and the vehicle speed V through electromagnetic solenoids (including linear solenoids and shift solenoids) and associated hydraulic actuators (such as clutches), to transmit power generated by an internal combustion engine to drive wheels. This shift control algorithm is inputted to the simulator main unit 12 through the input/output interface 14 and is stored in the memory 12b.

The simulator 10 has a group of pseudo-signal generators 18 which generate a pseudo signal of the linear solenoids and another group of pseudo-signal generators 20 which generate similar pseudo signal of the shift solenoids. The outputs of the generators 18 and 20 are also input to the simulator main unit 12 through the input/output interface 14. These pseudo signals are used to operate the hydraulic actuators such as clutches, as explained later. In addition, other pseudo signals indicative of the throttle opening θTH and the vehicle speed V are generated by generators (not shown) and are input to the simulator main unit 12 through the input/output interface 14.

As illustrated in the figure, the programs or packages 10a generated in an off-line computer (not shown) are downloaded, and contain a first model ("engine model), a second model ("transmission model") and a third model ("vehicle body model") each describing the behaviors of the engine, the automatic transmission and the body of the vehicle. Although not shown, the programs 10a include a fourth model which describes the non-linear behavior, i.e. oil supply to the hydraulic clutches in the second model.

In accordance with the downloaded programs 10a, the simulator main unit 12 inputs the generated pseudo signals, performs calculation of outputs of the first to third models (e.g. the driveshaft torque TDS, the engine speed Ne and clutch oil pressure Pnc) in a timely manner defined by a predetermined calculation cycle (sampling time or interval) in accordance with the stored shift control algorithm, and verifies and evaluates the stored shift control algorithm, while outputting the results of verification and evaluation through a display 24.

Design of the programs 10a to be downloaded to the simulator main unit 12 of the simulator 10 will be explained with reference to a flow chart of FIG. 2.

In S10, the first to fourth models (describing the behavior of the engine, the automatic transmission, etc.) in the programs 10a should first be designed.

Design of the second model describing the behavior of the automatic transmission will first be explained.

Figure 3:
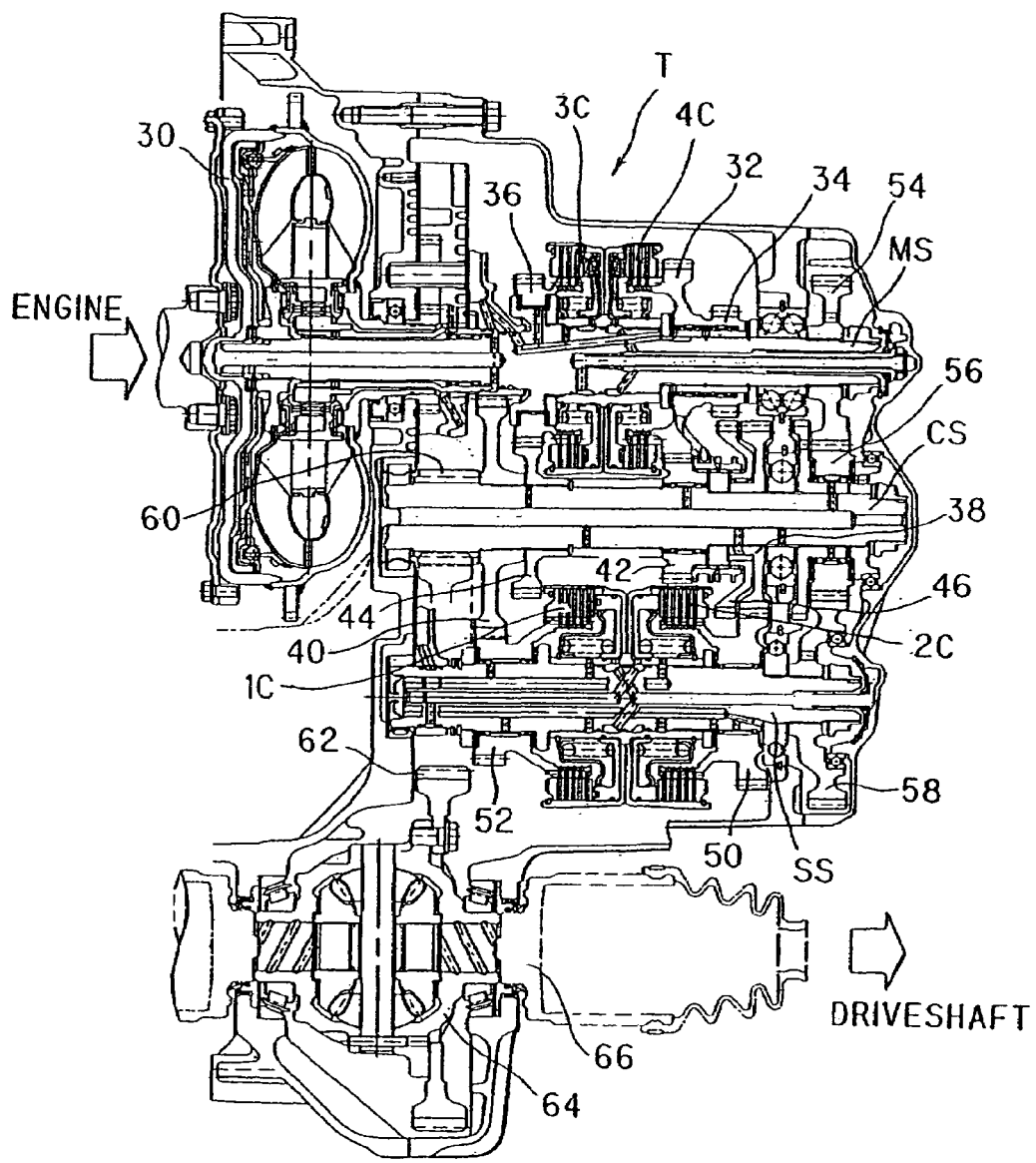
FIG. 3 is an explanatory view showing the automatic transmission to be modelled in designing the programs.

FIG. 3 is an explanatory sectional view of the automatic transmission (hereinafter referred to as "transmission") T to be modelled.

The automatic transmission T comprises the type of parallel-installed-shafts having a change-speed system and associated hydraulic clutches of four forward gears (speeds) and one reverse gear and is mounted on the vehicle (not shown).

Specifically, the transmission T is equipped with a main shaft (transmission input shaft) MS connected to a crankshaft (not shown) of the engine through a torque converter 30 having a lockup mechanism, a countershaft (transmission output shaft) CS provided in parallel with the main shaft MS and a secondary shaft SS provided in parallel therewith. These shafts carry gears.

More specifically, the main shaft MS carries a fourth-speed drive gear 32 and adjoining thereto, a reverse drive gear 34 at the right and a third-speed drive gear 36 at the left (in the figure). The gears are rotatably mounted on the main shaft MS.

The countershaft CS carries a second-speed driven gear 38 and a first-speed driven gear 40 which are fixed on the shaft and mesh with gears of the secondary shaft SS. Further, the countershaft CS carries a fourth-speed driven gear 42 and a third-speed driven gear 44 which are fixed on the shaft and mesh with the corresponding drive gears 32, 36 of the main shaft MS, and a reverse driven gear 46 which is fixed on the shaft.

The secondary shaft SS carries a first-speed drive gear 50 and a second-speed drive gear 52 which are rotatably mounted on the shaft.

Further, the main shaft MS carries a first reduction gear 54 which is fixed on the shaft, the countershaft CS carries a second reduction gear 56 which is rotatably mounted on the shaft, and the secondary shaft SS carries a third reduction gear 58 which is fixed on the shaft. With this arrangement, the rotation of the main shaft MS is reduced and transmitted to the secondary shaft SS.

In the above, when a first-speed clutch (hydraulic clutch; hydraulic actuator) 1C is supplied with pressurized oil such that the first-speed drive gear 52 is fixed on the secondary shaft SS, the first speed (1st gear or gear ratio) is established. When a second-speed clutch (hydraulic clutch; hydraulic actuator) 2C is supplied with pressurized oil such that the second-speed drive gear 50 is fixed on the secondary shaft SS, the second speed (2nd gear or gear ratio) is established. When a third-speed clutch (hydraulic clutch; hydraulic actuator) 3C is supplied with pressurized oil such that the third-speed drive gear 36 is fixed on the main shaft MS, the third speed (3rd gear or gear ratio) is established.

When a fourth-speed clutch (hydraulic clutch; hydraulic actuator) 4C is supplied with pressurized oil such that the fourth-speed drive gear 32 is fixed on the main shaft MS, the fourth speed (4th gear or gear ratio) is established. When the fourth-speed clutch 4C is supplied with pressurized oil and the reverse drive gear 34 is fixed on the main shaft MS by a selector, the reverse gear is established. The rotation of the reverse drive gear 34 is transmitted to the reverse driven gear 46 through a counter gear (not shown).

The countershaft CS is connected to a final drive gear 60 and the final drive gear 60 is connected to the final driven gear 62. The final driven gear 62 is connected to a driveshaft 66 through a differential 64. The driveshaft 66 is connected to driven wheels (not shown) of the vehicle whereby the power is transmitted from the engine to the driven wheels through the countershaft CS.

Although not shown, the engine and the transmission T are mounted on the vehicle, and various sensors are provided at the engine and the vehicle, including a crank angle sensor which generates a signal indicative of the engine speed Ne, a manifold absolute pressure sensor which generates a signal indicative of the manifold pressure in absolute value (engine load), a throttle position sensor which generates a signal indicative of the throttle opening θTH of the throttle valve, a vehicle speed sensor which generates a signal indicative of the vehicle speed V and a shift lever position sensor which generates a signal indicative of the position of the shift lever selected by the vehicle operator, etc.

Further, a first rotational speed sensor is provided in the vicinity of the main shaft MS and generates a signal indicative of the rotational speed Nm of the transmission input shaft based on the rotation of the main shaft MS. A second rotational speed sensor is provided in the vicinity of the countershaft CS and generates a signal indicative of the rotational speed Nc of the transmission output shaft based on the rotation of the countershaft CS. Furthermore, a temperature sensor is installed in the transmission T or at another appropriate location and generates a signal indicative of the oil temperature, i.e., the temperature TATF of Automatic Transmission Fluid, and a brake switch is provided in the vicinity of a brake pedal (not shown) and generates an ON signal when the brake pedal is depressed by the vehicle operator.

The outputs of these sensors are sent to the ECU 16 constituting the shift controller. The ECU 16 comprises a microcomputer having a CPU (central processing unit), a ROM (read-only memory), a RAM (random access memory), an input circuit, an output circuit, etc. The ECU 16 determines the gear (gear ratio) based on the detected throttle opening and vehicle speed in accordance with the algorithm stored in the ROM. The ECU 16 then controls shifting by energizing or deenergizing electromagnetic solenoids including the linear solenoids and shift solenoids provided in the hydraulic circuit (not shown) connected to the clutches 1C, 2C, 3C, 4C such that the determined gear is established. The outputs of the linear solenoids and the shift solenoids correspond to the pseudo signals.

Since the characteristic features of the invention reside in the simulator 10, a more detailed explanation of the shift control performed by the ECU 16 is omitted.

Returning to the explanation of the program 10a to be downloaded on simulator main unit 12, the behavior of the transmission T can be expressed by equations of motion illustrated in FIG. 4. The transitional shift phase can be expressed as shown at the bottom of the figure. The elements used in the equation are shown at the top of the figure.

Figure 5:
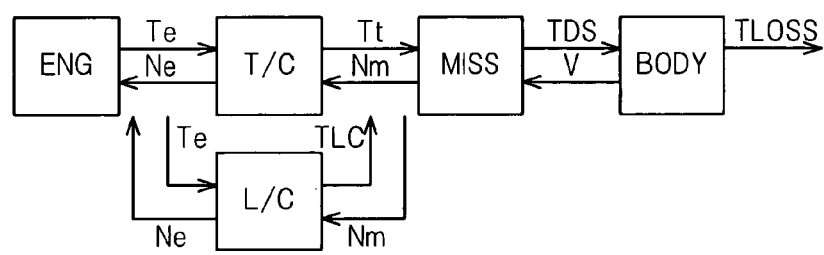
FIG. 5 is an explanatory block diagram showing models of the entire system from the engine to the body of the vehicle on which the automatic transmission is mounted.

Based on the equations of motion illustrated in the figure, the entire system from the engine to the vehicle body can be modelled as shown in FIG. 5. In the figure, "ENG" indicates the engine model (first model) describing the behavior of the engine, "MISS" indicates the transmission model (second model) describing the behavior of the transmission T and "BODY" indicates the vehicle body model (third model) describing the behavior of the vehicle body.

In the figure, torque Te outputted from the engine model is inputted to the torque converter 30 (illustrated in the figure as "T/C") where it is converted and is renamed torque Tt which is inputted to the transmission model. The transmission model outputs the driveshaft torque TDS which is inputted to the vehicle body model that outputs the toque loss TLOSS indicative of the torque loss in the vehicle body system.

At the same time, the transmission model inputs the vehicle speed V and outputs the main shaft rotational speed Nm which is converted by the torque converter (T/C) 30 into the engine speed Ne that is inputted to the engine model. When the torque converter lock-up clutch operates, the engine torque Te is converted into the lock-up clutch output torque TLC.

Figure 6:
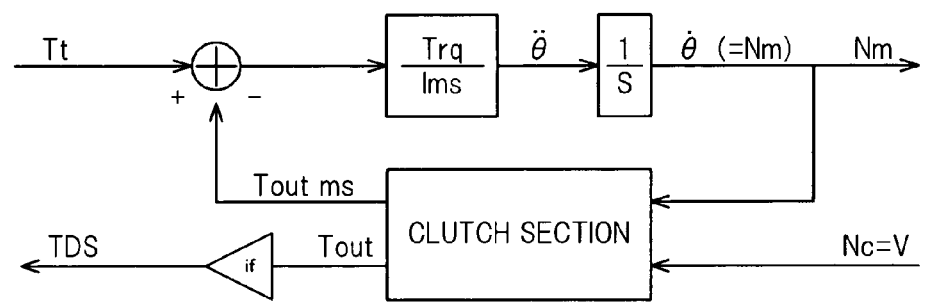
FIG. 6 is an explanatory block diagram showing the transmission model illustrated in FIG. 5 in detail.

FIG. 6 shows the configuration of the transmission model in detail. In the figure, "clutch section" indicates the aforesaid fourth model which describes the non-linear behavior of the elements in the second model, i.e., the first-speed clutches 1C to the fourth-speed clutch 4C.

In the figure, the difference Trq between the torque converter output torque Tt and the main shaft torque Tout ms (outputted from the clutch section) is divided by the main shaft inertia Ims and the quotient is then converted into a value of rotational angular acceleration (quadratic differential of angle θ). The rotational angular acceleration value is then converted into a value of rotational angular velocity (linear differential of angle θ) by the integral factor 1/S and the converted value is outputted as the main shaft rotational speed Nm.

The main shaft rotational speed Nm is, on the other hand, inputted to the clutch section. The clutch section outputs the main shaft output torque Tout ms (which is subtracted from the torque converter output torque Tt at the subtracter) and the output torque Tout which is then multiplied by the final reduction gear ratio if to determine the driveshaft torque TDS.

Figure 7:
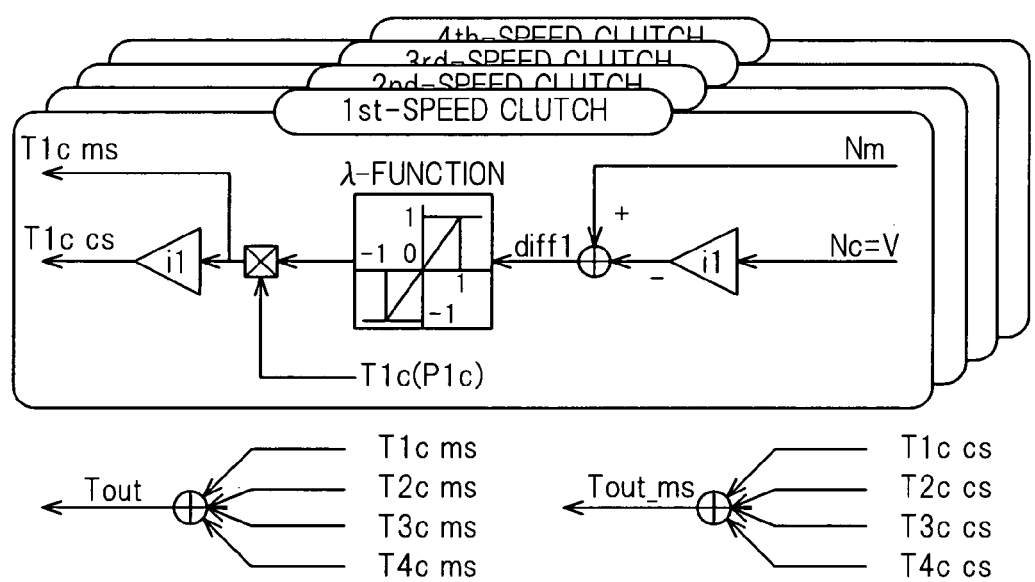
FIG. 7 is an explanatory block diagram showing a model comprising the clutch section and the integral factor in the configuration illustrated in FIG. 6 in detail.

FIG. 7 shows the configuration of the fourth model comprising the clutch section (and the integral factor) in detail, taking the 1st-speed clutch C1 as an example.

As illustrated, in the clutch section, the difference between the main shaft rotational speed Nm and the product obtained by multiplying the countershaft rotational speed Nc (equal to the vehicle speed V) by 1st-speed reduction gear ratio i1, is calculated. Specifically, the difference between the rotational speed of the secondary shaft SS (corresponding to a reduced main shaft rotational speed Nm by a predetermined reduction gear ratio (e.g. 1.3)) and the product, more specifically the rotational difference diff1 between the secondary shaft rotational speed and the rotational speed of the 1st-speed drive gear 50, is calculated.

The calculated rotational difference diff1 is then inputted to a λ-function and the output therefrom is multiplied by the 1st-speed clutch transmission torque T1c (which is proportional to the supplied oil pressure P1c of the 1st-speed clutch C1) and the product is determined as the main shaft torque T1c ms (torque acting on the main shaft MS through the 1st-speed clutch C1). At the same time, the product is multiplied by the 1st-speed gear reduction ratio i1 to determine the countershaft torque T1c cs (torque acting on the countershaft CS through the 1st-speed clutch C1).

Figure 8:
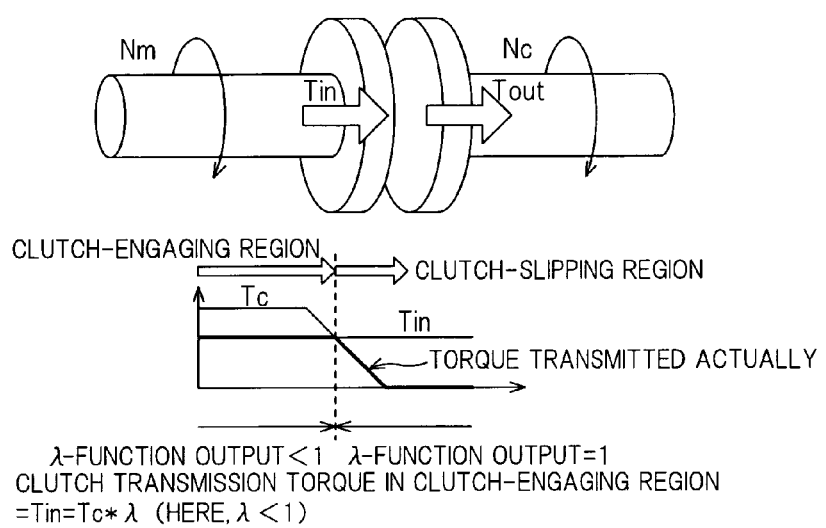
FIG. 8 is an explanatory view showing the λ-function used in the configuration illustrated in FIG. 7.

This λ-function will be explained with reference to FIG. 8.

As illustrated in the graph of the figure, the λ-function is a function that normalizes the output (y-axis value) relative to the input (x-axis value) to a predetermined value. In this embodiment, defining the transmission input torque as Tin and the transmission output torque as Tout, the function is designed such that its output is less than 1 in the clutch-engaging region, while it is 1 in the clutch-slipping region. Specifically, the clutch transmission torque Tc is calculated as Tc×λ (where λ<1) in the clutch-engaging region. In this embodiment, the λ-function is determined such that it outputs 1 [rpm] relative to the input of 1 [rpm]. The reason why the λ-function output is determined to be less than 1 in the clutch-engaging region is that the clutch transmission torque is consumed by the inertia of the vehicle body, etc.

Figure 9:
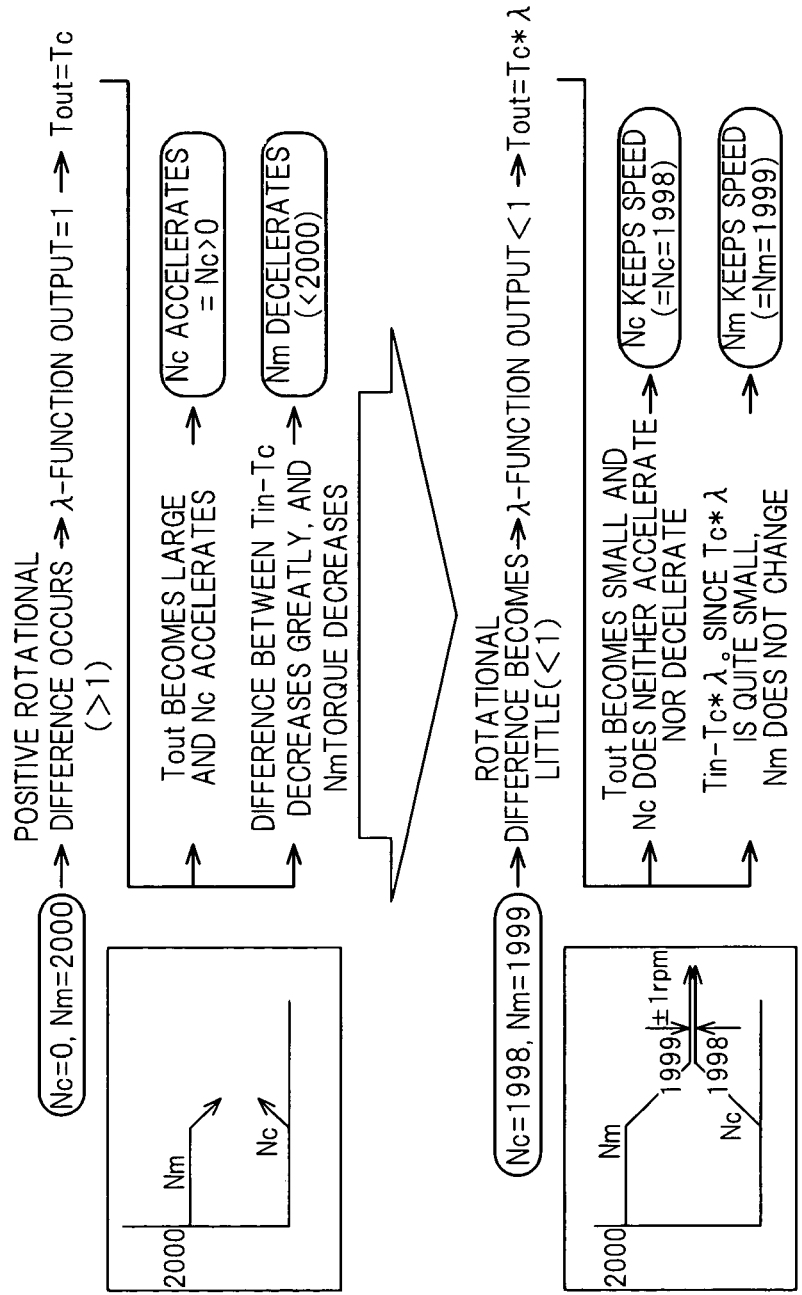
FIG. 9 is an explanatory view similarly showing the λ-function used in the configuration illustrated in FIG. 7.

This λ-function will be further explained with reference to FIG. 9.

When the transmission T operates as shown at the upper half of the figure, the rotation difference diff1 (explained with reference to the block diagram of FIG. 7) becomes 2000 [rpm] and exceeds 1. However, since the λ-function output is determined to be 1, the output torque Tout becomes equal to the clutch transmission torque Tc. As a result, since the output torque Tout increases, the countershaft rotational speed Nc is accelerated and exceeds zero. At the same time, the difference between the input torque Tin and the clutch transmission torque Tc decreases greatly, and the main shaft rotation decreases. More specifically, as illustrated in the upper left graph, the main shaft rotational speed Nm and the countershaft rotational speed Nc becomes close to each other and converge.

Then, as illustrated in the lower left graph, when the main shaft rotational speed Nm and the countershaft rotational speed Nc converge or becomes more close to each other such that the difference therebetween is within 1 [rpm], the rotational difference is almost zero. In this clutch-engaging region, the λ-function output is set to be a value less than 1 and the output torque Tout will therefore be Tc×λ. Since the output torque Tout is quite small, the countershaft CS can keep its rotational speed. The difference between the input torque Tin and the output torque Tout (Tout×λ) will also be quite small such that the main shaft can keep its rotational speed.

Returning to the explanation of FIG. 6, in the transmission model illustrated in the figure, thus, the rotational difference is calculated and a feedback control is conducted such that the input torque and the output torque are balanced with each other.

The clutch transmission torque varies with the amount of pressurized oil supply as the shift proceeds. However, since the model has the λ-function and the integral factor, it can describe the behavior of the hydraulic clutch whose operation is non-linear.

Figure 2:
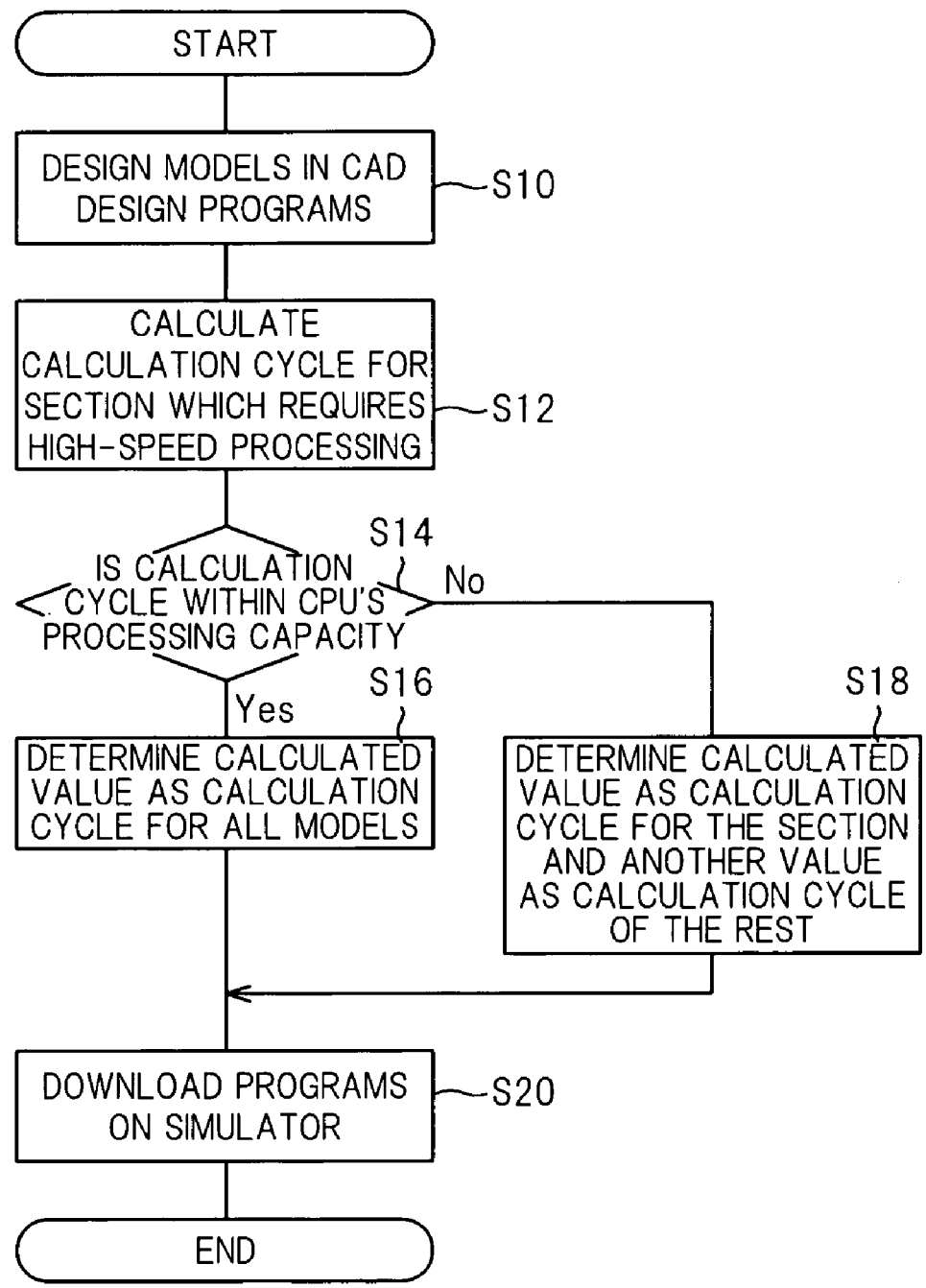
FIG. 2 is a flow chart showing a design of the programs to be downloaded on a main simulator main unit of the simulator illustrated in FIG. 1.

Returning to the explanation of the flow chart of FIG. 2, next in S12, the calculation cycle or interval (sampling time for the section which requires high-speed processing, i.e., the clutch section and the integral factor) is calculated.

As explained above, when the λ-function and the integral factor are used in the calculation, it generally becomes necessary to conduct calculation at a quite short interval such as 1 μsec., rendering the calculation cycle frequent or short. It would accordingly take much time to simulate the event even in a single shift.

Figure 10:
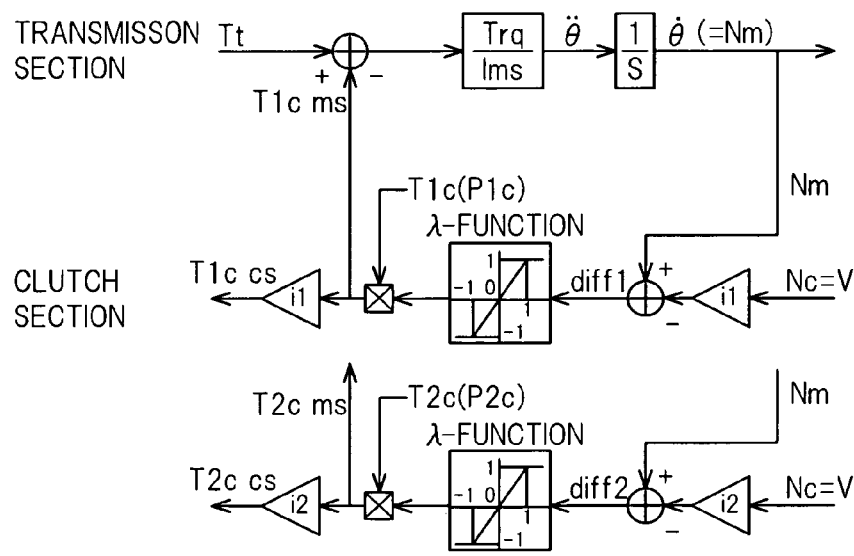
FIG. 10 is an explanatory block diagram showing the transmission model illustrated in FIG. 6 in detail.
Figure 11:
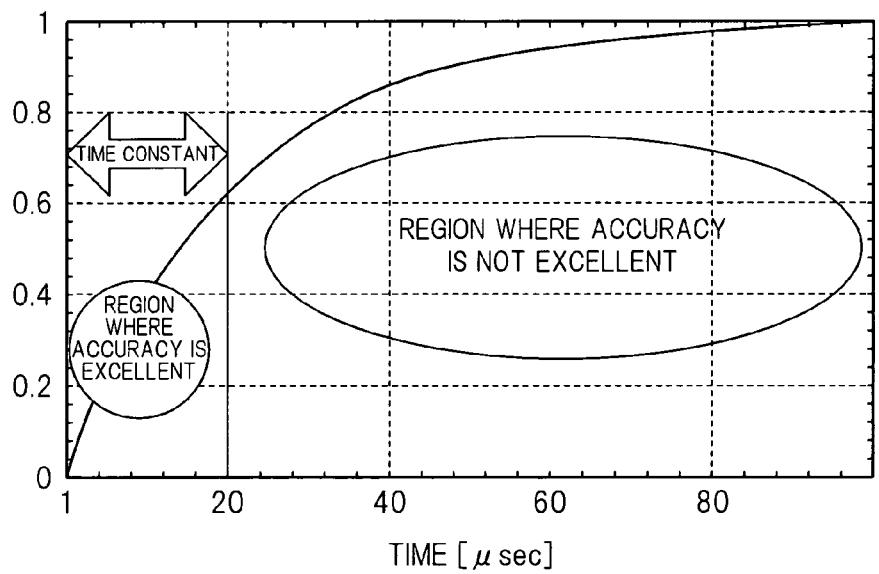
FIG. 11 is a simulation result showing a step response of the 1st-speed clutch transmission torque relative to the torque inputted to the clutch section and the integral factor in the transmission model illustrated in FIG. 10.

Explaining this with reference to FIGS. 10 and 11, FIG. 10 is a block diagram showing the configuration of the transmission model of FIG. 6 in more detail, where only the first-speed clutch C1 and the second-speed clutch C2 are depicted as representative of the clutch section. FIG. 11 shows a simulation result indicating a step response of the transmission torque of the 1st-speed clutch C1 (more precisely T1c ms) relative to the input torque Tt (torque converter output torque).

As illustrated in FIG. 11, when the calculation cycle (sampling time) exceeds 20 μsec., in such a discrete-time system in this embodiment, it becomes impossible to describe the system state change accurately and the simulation result is not satisfactory. In view of this, the calculation cycle for that section is determined to be 20 μsec. (second calculation cycle) in this embodiment such that the calculation cycle (corresponding to the time constant) is within the permissible range.

Specifically, this calculation cycle (time constant) depends on the inertia I (to be converted into a value that acts on the main shaft MS) and the gear reduction ratio r. Defining the calculation cycle (time constant) as τ, it can be expressed as a follows:

$$\tau = I \cdot (2.24 \times 10^{-6} \cdot r^2 - 2.4 \times 10^{-8} \cdot r + 8.54 \times 10^{-9}) \cdot 1.41 \times 10^{2} \cdot (1/\lambda) \quad \text{Eq. 1}$$

In the above, λ means the aforesaid λ-function.

Figure 12:
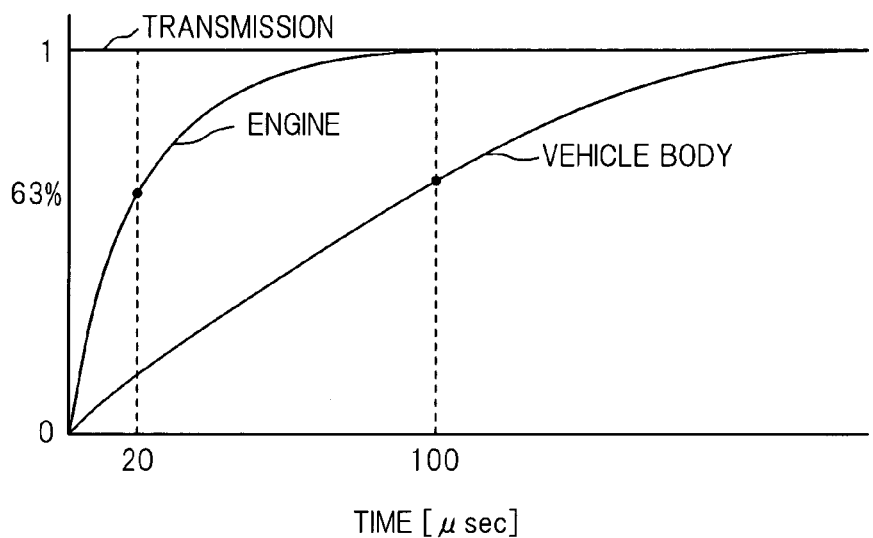
FIG. 12 is an explanatory graph showing the step responses of the engine system, etc., in the simulation result illustrated in FIG. 11.

FIG. 12 is an explanatory graph of the step responses of the engine system, etc. in the simulation result illustrated in FIG. 11. As illustrated, the time constant of the transmission is almost zero and is a step-like response, compared to those of the engine and the vehicle body. This is because the transmission inertia exerted on the main shaft MS is extremely small compared to those of the engine and the vehicle body as will be understood from the inertia values mentioned at the bottom of the figure.

Figure 13:
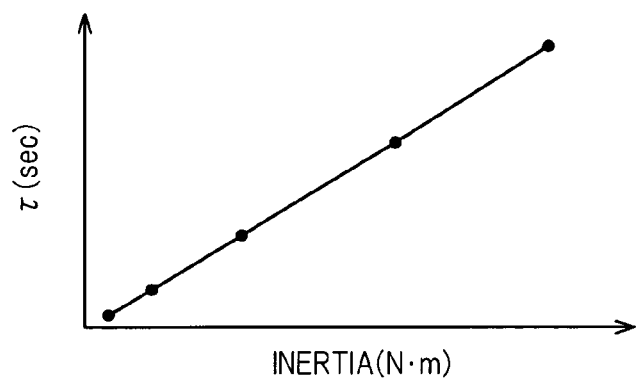
FIG. 13 is a simulation result showing the relationship between the time constant (calculation cycle) τ relative to the inertia in the model.
Figure 14:
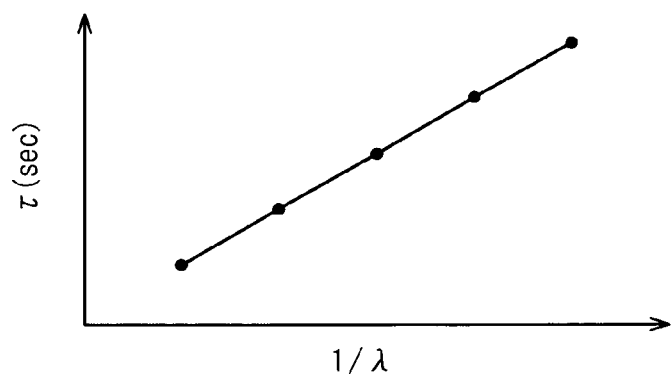
FIG. 14 is a simulation result showing the relationship between the time constant (calculation cycle) τ relative to the λ-function in the model.
Figure 15:
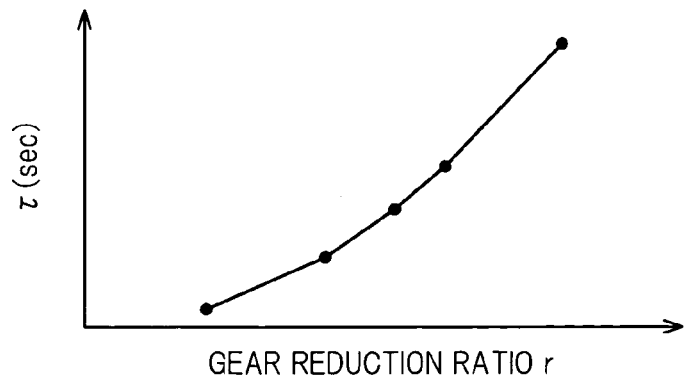
FIG. 15 is a simulation result showing the relationship between the time constant (calculation cycle) τ relative to gear reduction ratio in the model.

Accordingly, as illustrated in FIGS. 13 to 15, the relationships between the time constant (calculation cycle) τ and the model parameters (illustrated in their x-axes) are obtained by varying the parameters. FIG. 13 shows the relationship between the time constant and the inertia I; FIG. 14 shows that between the time constant and the reciprocal of the λ-function (i.e. the slope of the λ-function); and FIG. 15 shows that between the time constant and the gear reduction ratio r. The data illustrated in FIG. 15 is based on a quadratic approximation obtained by regression analysis within a possible gear reduction range. (Since the accuracy was almost the same even if the order of approximation was increased, the order of approximation is limited to the second order.)

As can be seen from FIGS. 13 to 15, the time constant (sampling time) τ is in proportion to parameters such as the inertia I.

Based on this, the time constant (calculation cycle) τ is determined in this embodiment according to the equation mentioned above. To be more specific, this is determined to be 20 μsec.

Returning to the explanation of FIG. 2, next in S14, it is determined whether the calculated calculation cycle (time constant) τ is within the processing capacity or performance of the CPU 12a of the simulator main unit 12. In other words, it is determined whether the CPU 12a is able to conduct the data processing at the calculation cycle.

When the result is affirmative in S14, since the calculated calculation cycle is within the processing capacity of the CPU 12a, in S16 the calculated value is determined as the calculation cycle for all the models including the transmission model. On the other hand, when the result in S14 is negative, in S18 the calculated value is determined as the calculation cycle for only the clutch section (and the integral factor) of the transmission model, whereas that for the rest of the transmission model and the engine and vehicle body models is determined as another calculation cycle which is within the processing capacity of the CPU 12a.

Specifically, as mentioned just above, in order to achieve desired accuracy, it is necessary to limit the calculation cycle to a required small value (e.g. 20 μsec). However, the calculation cycle is not free from the performance or capacity of the CPU on which the data processing is conducted.

If the calculation cycle is not within the performance or capacity of the CPU, it therefore becomes necessary to correct it.

Moreover, the calculation cycle determined from the performance of the CPU 12a of the simulator main unit 12 also depends on the complexity of the models. From the models in this embodiment, several hundreds of μsec., more precisely 200 μsec., is the limit. For that reason, the calculation cycle for the transmission model, the engine model and the vehicle body model is determined to be 200 μsec (first calculation cycle).

Next in S20, the programs 10a are downloaded on the simulator main unit 12.

Figure 16:
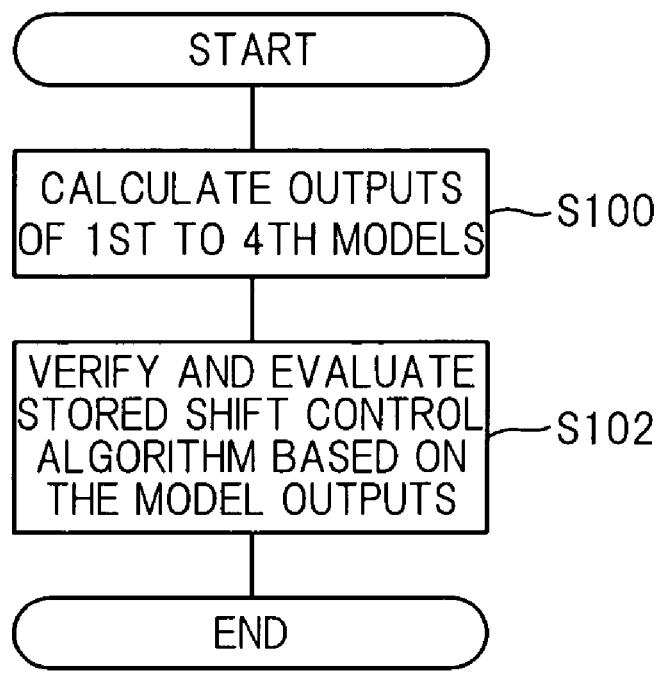
FIG. 16 is a flow chart showing the operation of the simulator conducted based the downloaded programs designed in the procedures illustrated in FIG. 2.

FIG. 16 is a flow chart showing the operation of the simulator 10 conducted based on the downloaded programs 10a.

The program begins in S100 in which the outputs of all the models including the transmission model are calculated. As regards the fourth model, the output of the one describing the supply of hydraulic oil pressure to the clutches of the gear (speed) to be shifted to and from in a simulated shift should be calculated.

Expressing the data processing in the configuration illustrated in FIG. 5, the calculation should be repeated at every 20 μsec. for the clutch section (and the integral factor). Defining the calculation cycle (first calculation cycle) of 200 μsec as a basic calculation for all the models (except for the clutch section (and the integral factor)), the integration time should be determined to be a value obtained by dividing the basic calculation cycle by the number of repetitions.

Specifically, the job routine of the high-speed calculation cycle block (i.e., the clutch section and integral factor) is called as a function of the basic calculation cycle block (all the models illustrated in FIG. 5). In other words, the parameters to be inputted to the basic calculation cycle block are fixed until the calculations of the high-speed calculation cycle block have been completed.

More specifically, the high-speed calculation cycle block is started in synchronism with the basic calculation cycle block, and no recursive processing is made until the basic calculation cycle block calculations have been completed. Thus, once started, the high-speed calculation cycle block outputs the calculation result processed based on the parameters inputted at the previous time and then conducts new calculations based on the parameters inputted at the current time. Having been configured in this manner, it becomes possible to model the entire system completely, in spite of the use of the calculation cycle blocks whose calculation cycles are different from each other.

Figure 17:
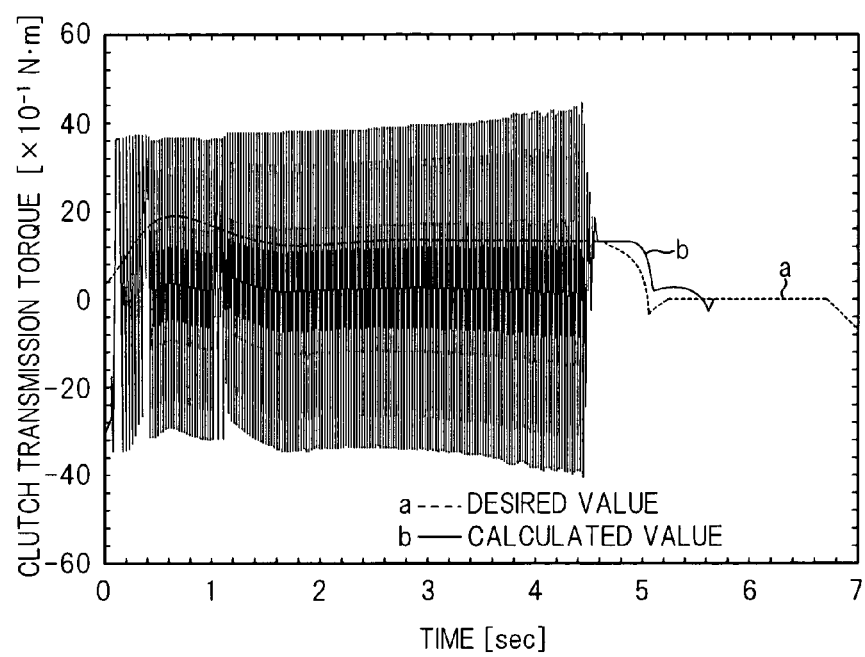
FIG. 17 is a simulation result using the models illustrated in FIG. 5 with the calculation cycle of 200 µsec.

FIG. 17 shows a simulation result indicative of the clutch transmission torque Tc (more precisely, the 1st-speed clutch transmission torque) conducted along the shift control algorithm stored in the ECU 16 using the models illustrated in FIG. 5 with the calculation cycle of only the basic cycle (i.e., 200 μsec.). Since the non-linear clutch section (and the integral factor) was simulated using the same interval of 200 μsec., the simulation result reveals that the calculated value (marked by "b") diverged from a desired value (marked by "a") in the shift control algorithm. Thus, the simulation accuracy is insufficient and this makes it impossible to verify and evaluate the shift control algorithm stored in the ECU 16 sufficiently. Here, the desired value is a real-world value obtained by an appropriate manner.

Figure 18:
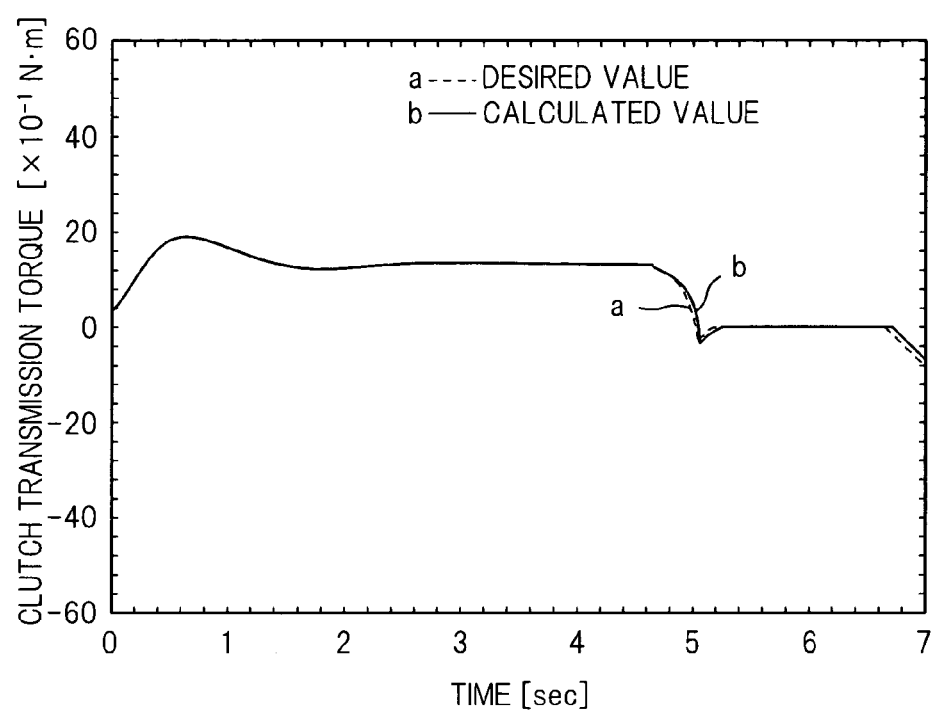
FIG. 18 is another simulation result using the calculation cycles of 20 µsec. and 200 µsec.

FIG. 18 shows another simulation result indicative of the same clutch transmission torque Tc using the configuration wherein the models are divided into the basic calculation cycle block and the high-speed calculation cycle block. Since the two kinds of the calculation cycles of 20 μsec. and 20 μsec. are used, the simulation result reveals that the calculated value (marked by "b") converged to the desired value (marked by "a") in the shift control algorithm, therby enabling verification and evaluation of the shift control algorithm stored in the ECU 16 satisfactorily.

Returning to the explanation of the flow chart, the program then proceeds to S102 in which the shift control algorithm stored in the ECU 16 is verified and evaluated based on the outputs of the models illustrated in FIG. 5.

Figure 19A:
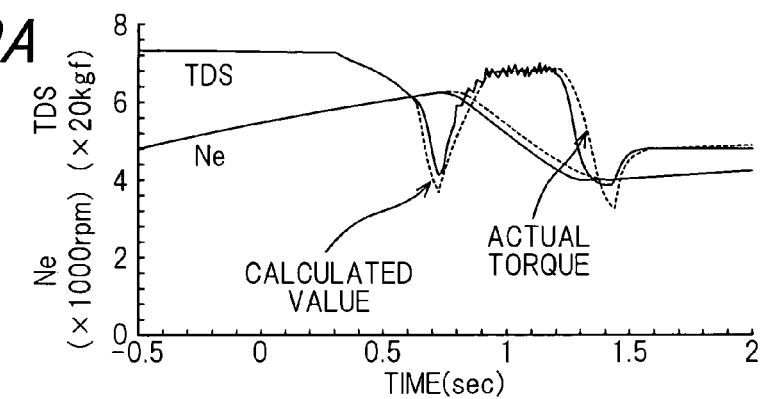
FIGS. 19A, 19B and 19C are a set of graphs showing the outputs of the simulator illustrated in FIG. 1 according to the embodiment of the invention.
Figure 19B:
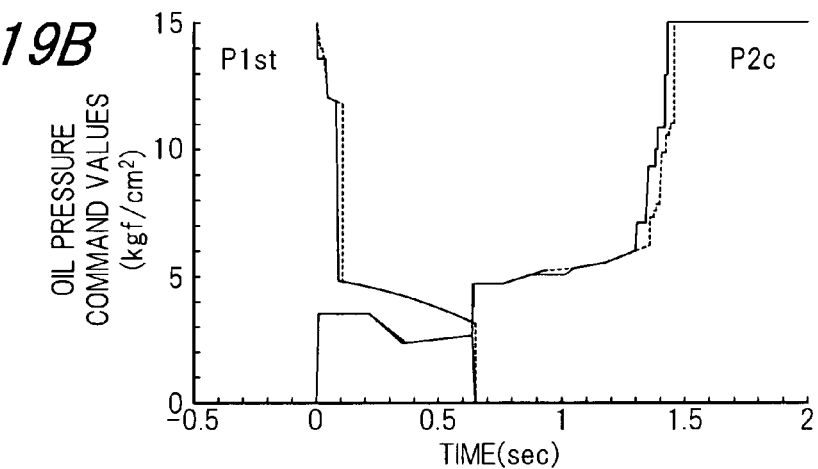
Figure 19C:
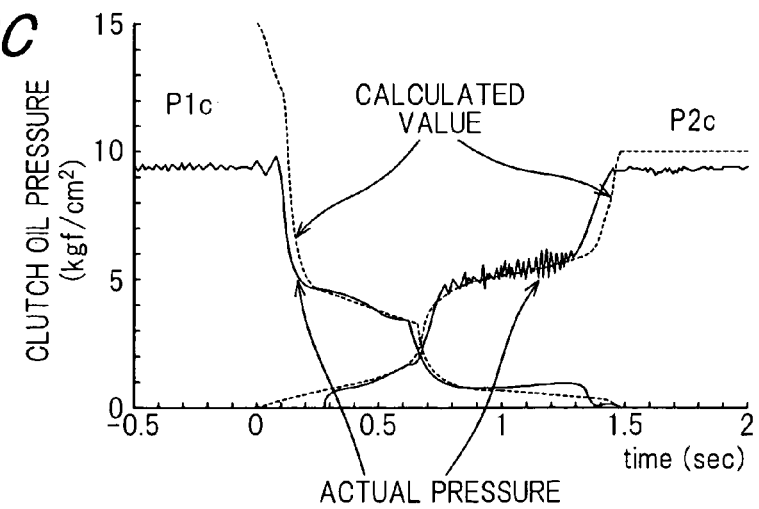

FIG. 19 is a set of graphs indicative of the outputs of the simulator 10 illustrated in FIG. 1, wherein FIG. 19A shows the driveshaft torque TDS and the engine speed Ne; FIG. 19B shows oil pressure command values supplied to the 1st-speed clutch C1 and the 2nd-speed clutch C2; and FIG. 19C shows the oil pressures P1c and P2c to be supplied to the clutches based on the command values.

In FIGS. 19A and 19C, the word "actual" indicates a value supposed to be supplied to the vehicle in the real-world based on the stored shift control algorithm. As will be seen from the figures, the calculated (outputted) values track the actual values faithfully such that the stored shift control algorithm can been well verified and evaluated by, for example, changing colors of the lines indicative of the calculated and actual values such that they can be discriminated from each other in the display 24 illustrated in FIG. 1.

The embodiment is thus configured to have a simulator (10) having computer-aided design programs (10a) for verifying an algorithm of a shift controller (ECU 16) of an automatic transmission (T) mounted on a vehicle having a change-speed system and associated hydraulic actuators (C1–C4) to transmit power generated by an internal combustion engine to drive wheels based on at least throttle opening and vehicle speed in accordance with the algorithm, including: a computer (12) which stores the computer-aided design programs in memory (12b) and connected to the shift controller for inputting the algorithm. The characteristic features are that the simulator includes: pseudo signal generating means (18, 20) connected to the computer for generating pseudo signals indicative of at least the throttle opening, the vehicle speed and operation signals for the hydraulic actuators and for sending the pseudo signals to the computer; wherein the computer-aided design programs includes: first calculating means (S10–S20, S100) for calculating outputs of a first model describing behavior of the engine, a second model describing behavior of the transmission and a third model describing behavior of a body of the vehicle at a first calculation cycle (200 μsec.) based on the algorithm and the pseudo signals; second calculating means (S10–S20, S100) for inputting at least the calculated outputs of the first model and the second model and for calculating an output of a fourth model describing non-linear behavior in the second model at a second calculation cycle (20 μsec.), which is shorter than the first calculation cycle; and algorithm verifying means (S102) for verifying the algorithm based on the outputs of the first model, the second model and the third model. With this, it can simulate the behaviors of the automatic vehicle transmission including the non-linear behavior of hydraulic actuators in real time, thereby enabling verification or evaluation of the control algorithm in a real-world environment.

In the simulator, the fourth model describes the behavior of supply of hydraulic oil to clutches of the gears to be shifted to and from at a shift. With this, it can simulate the behaviors of the automatic vehicle transmission including the non-linear behavior of hydraulic actuators such as the clutches of the gears to be shifted to and from in real time, thereby enabling to verify or evaluate the control algorithm in a real-world environment.

In the simulator, the second calculation cycle is determined based on a step response relative to an input to the fourth model. With this, it becomes possible to determine the second calculation cycle appropriately and hence, it can simulate in real time the behaviors of the automatic vehicle transmission including the non-linear behavior of hydraulic actuators such as the clutches of the gears to be shifted to and from, thereby enabling verification or evaluation of the control algorithm in a real-world environment.

In the simulator, the fourth model is configured to output the input through a λ-function and the second calculation cycle is determined to be a value which is proportional to a reciprocal of the λ-function. With this, it becomes possible to determine the second calculation cycle more appropriately and hence, it can simulate in real time the behaviors of the automatic vehicle transmission including the non-linear behavior of hydraulic actuators such as the clutches of the gears to be shifted to and from in real time, thereby enabling verification or evaluation of the control algorithm in a real-world environment.

It should be noted in the above that, although the simulator main unit 12 has the single CPU 12a where the processing of the high-speed calculation cycle block is conducted in synchronism with that of the basic calculation cycle block, it is alternatively possible to prepare a second CPU to be able to communicate with the CPU 12a such that they each conduct the processing of one of the blocks in synchronism with the other.

While the invention has thus been shown and described with reference to specific embodiments, it should be noted that the invention is in no way limited to the details of the described arrangements but changes and modifications may be made without departing from the scope of the appended claims.

What is claimed is:

1. A simulator having computer-aided design programs for verifying an algorithm of a shift controller of an automatic transmission mounted on a vehicle having a change-speed system and associated hydraulic actuators to transmit power generated by an internal combustion engine to drive wheels based on at least throttle opening and vehicle speed in accordance with the algorithm, comprising:

a computer which stores the computer-aided design programs in memory and connected to the shift controller for inputting the algorithm;

pseudo signal generating means connected to the computer for generating pseudo signals indicative of at least the throttle opening, the vehicle speed and operation signals for the hydraulic actuators and for sending the pseudo signals to the computer;

wherein the computer-aided design programs include:

first calculating means for calculating outputs of a first model describing behavior of the engine, a second model describing behavior of the transmission and a third model describing behavior of a body of the vehicle at a first calculation cycle based on the algorithm and the pseudo signals;

second calculating means for inputting at least the calculated outputs of the first model and the second model and for calculating an output of a fourth model describing non-linear behavior in the second model at a second calculation cycle which is shorter than the first calculation cycle; and algorithm verifying means for verifying the algorithm based on the outputs of the first model, the second model and the third model.

2. A simulator according to claim 1, wherein the fourth model describes the behavior of supply of hydraulic oil to clutches of gears to be shifted to and from at a shift.

3. A simulator according to claim 1, wherein the second calculation cycle is determined based on a step response relative to an input to the fourth model.

4. A simulator according to claim 2, wherein the second calculation cycle is determined based on a step response relative to an input to the fourth model.

5. A simulator according to claim 3, wherein the fourth model is configured to output the input through a λ-function and the second calculation cycle is determined to be a value which is proportional to a reciprocal of the λ-function.

6. A simulator according to claim 4, wherein the fourth model is configured to output the input through a λ-function and the second calculation cycle is determined to be a value which is proportional to a reciprocal of the λ-function.

7. A simulator according to claim 1, wherein the second calculating means is started in synchronism with the first calculating means, but no recursive processing is made until the calculation of the first calculating means have been completed.

8. A simulator according to claim 7, wherein the second calculating means outputs the calculation result processed based on parameters inputted at the previous time and then conducts new calculations based on the parameters inputted at the current time.

* * * * *